May 17, 1938.  F. G. CURTIS  2,117,404
HOLDER FOR TWIN PAILS
Filed March 26, 1936
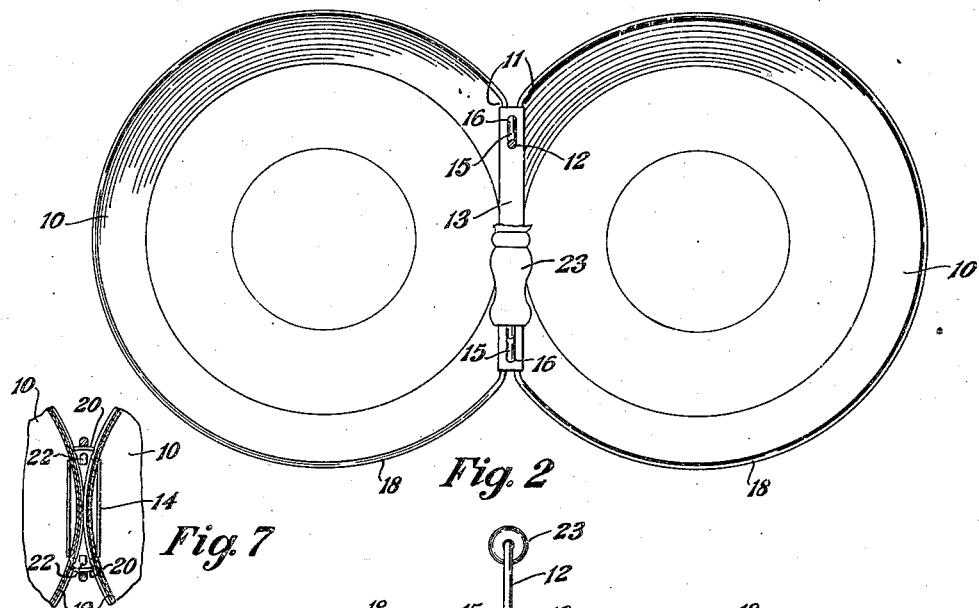
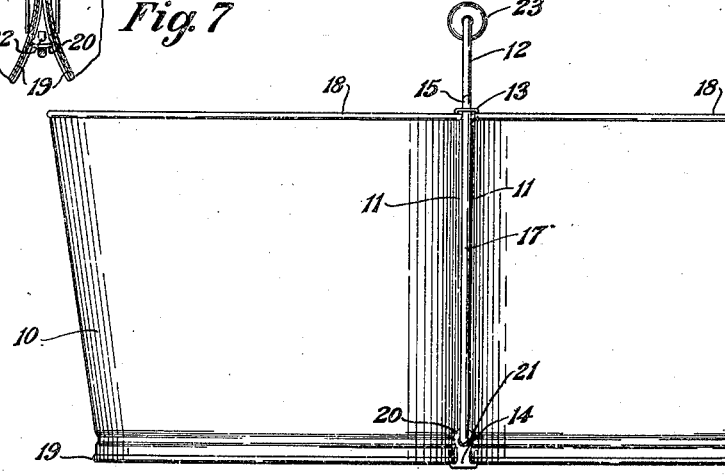
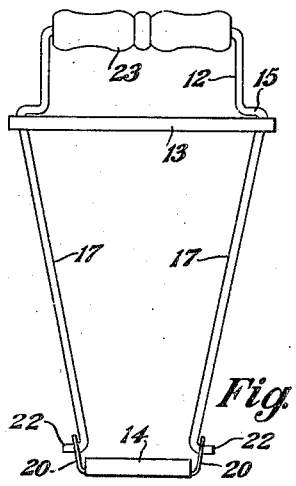
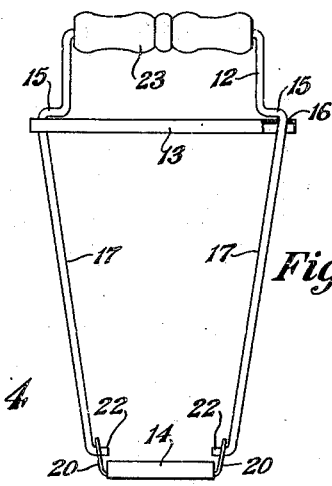
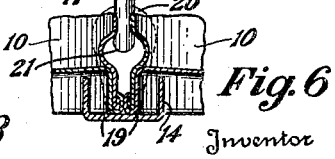
Inventor
Frederick G. Curtis
By Freast and Bishop
Attorneys Patented May 17, 1938

2,117,404

UNITED STATES PATENT OFFICE 2,117,404

HOLDER FOR TWIN PAILS

Frederick G. Curtis, Dover, Ohio, assignor to Reeves Steel and Manufacturing Company, Dover, Ohio, a corporation of Ohio Application March 26, 1936, Serial No. 71,068

8 Claims. (Cl. 224—45)

The invention relates to a holder for clamping two pails together for use as a unit to separately carry soapy and clear water for cleaning, scrubbing, washing woodwork, walls and the like.

The object of the improvement is to provide a holder which may be quickly and easily attached to or detached from two similar pails, the holder being provided with a single handle bail by means of which the two pails may be lifted and carried as a unit.

Another object is to provide a holder of this character including a pair of channel clip members adapted to clamp adjoining portions of the rim beads and chimes of the two pails together, a handle bail being connected to said channel clips to lift and carry the two pails as a unit.

A still further object of the improvement is to provide such a holder of a construction and size so that it may be quickly and easily detached from the pails and placed within one pail for storage or shipping, the pails being adapted to be nested within each other.

A still further object is to provide such a holder of simple and inexpensive construction, the holder comprising only the handle bail with the upper channel clip carried thereby, the handle bail having integral extensions, to the lower ends of which the lower channel clip may be detachably connected.

The above objects, together with others which will be apparent from the drawing and following description, or which may be later referred to, may be attained by constructing the improved holder in the manner illustrated in the accompanying drawing, in which Figure 1 is a side elevation of a pair of pails connected together with the improved holder;

Fig. 2, a top plan view of the pails and holder shown in Fig. 1;

Fig. 3, a detached elevation of the holder to which the invention pertains;

Fig. 4, a similar view of a slightly modified form of holder;

Fig. 5, an enlarged fragmentary sectional view showing the manner in which the adjoining rim bead portions of the pails are clamped together by the upper channel clip;

Fig. 6, a similar view showing the manner in which adjoining chime portions of the two pails are clamped together by the lower channel clip; and Fig. 7, a fragmentary plan sectional view through the adjoining chime portions of the two pails, showing the manner in which they are clamped together by the lower channel clip.

Similar numerals refer to similar parts throughout the drawing.

The pails adapted to be used with the improved holder, which are indicated generally at 10, may be substantially of usual or ordinary construction and design, excepting that the usual handle bails may be omitted and each pail is preferably slightly flattened at one side, as indicated at 11.

The improved holder to which the invention pertains may be formed of three main parts, comprising generally the handle bail 12 preferably formed of wire, the upper channel clip 13 normally carried by the handle bail and the lower channel clip 14 adapted to be detachably connected to the handle bail.

The handle bail 12 may be formed of a single piece of wire having the offset bends 15 therein at the lower extremity of the bail portion proper. The upper channel clip 13 is provided with apertures 16 near its ends through which the depending inwardly disposed integral legs 17 of the bail member are located, thus holding the upper clip 13 seated upwardly against said offset bent portions 15 of the bail.

The upper channel clip 13 is of a length substantially the width of the flattened faces 11 of the pails and of sufficient cross section to engage over the adjacent portions of the rim beads 18 of the two pails and clamp the same tightly against the inclined integral legs 17 of the bail member as shown in Figs. 1, 2 and 5.

The lower channel clip 14 is of inverted channel shape and of sufficient length and width to clamp the adjacent portions of the chimes 19 of the two pails together, as shown in Figs. 6 and 7. Upturned ears 20 are formed at the ends of the clip 14 and provided with apertures 21 to receive the angular ends 22 of the legs 17, which angular ends may be bent inward as shown in Fig. 3 or outward as shown in Fig. 4.

In assembling the pails and holder, the two pails are set with their flat faces together and the lower clip 14 is clamped over the chimes of the two pails as shown in Figs. 6 and 7. The bail member is then placed in position by inserting the legs 17 thereof between the two pails, the angular ends 22 of said legs being sprung into the openings 21 of the ears 20 on the lower clip, while the other clip is forced down over the adjacent portions of the rim beads 18 of the two pails, as best shown in Fig. 5, thus forming a unit of the two pails and holder, as shown in Figs. 1 and 2.

For the purpose of more easily carrying the two pails when filled with water, a hand grip 23 of wood or the like may be provided upon the bail 12.

The two pails may be thus lifted and carried as a unit by means of the bail.

In order to detach the holder from the pails so that the water may be emptied from each pail singly, it is only necessary to spring the legs 17 either outward or inward, depending upon whether the invention is made in the form shown in Fig. 3 or Fig. 4, releasing the angular ends 22 of the legs 17 from engagement with the ears 20 of the lower clip, which may be easily removed and the bail and upper clip may be lifted upward out of engagement with the pails.

In shipping the pails and holders, a number of the pails may be nested together and placed in a single carton and the two parts of the holder may be placed within the upper or innermost pail.

Preferably twelve pails are shipped in a carton, the pails being nested in two tiers of six each with the holders located in the uppermost pails of each tier. Thus a carton of comparatively small size may contain six complete units.

I claim:

1. In combination with two similar pails having adjacent sides abutting each other and each having a rim bead and a chime, a holder including a handle bail extending above the tops of the pails and having depending, integral legs, channel clip means at the upper portions of said legs for engaging and clamping adjacent portions of the rim beads of the two pails together and channel clip means at the lower portions of said legs for engaging and clamping adjacent portions of the chimes of the two pails together, the lower channel clip means being detachably connected to said legs.

2. In combination with two similar pails each having a rim bead and a chime, a holder including a handle bail having depending legs, a channel clip engaging and clamping adjacent portions of the rim beads of the two pails together and having apertures through which said legs are located, and a channel clip engaging and clamping adjacent portions of the chimes of the two pails together, and means for detachably connecting the last named channel clip to the lower ends of said legs.

3. In combination with two similar pails each having a rim bead and a chime, a holder including a handle bail having depending legs, a channel clip engaging and clamping adjacent portions of the rim beads of the two pails together and having apertures through which said legs are located, off-set bends in said legs above said channel clip, and a channel clip engaging and clamping adjacent portions of the chimes of the two pails together, and means for detachably connecting the last named channel clip to the lower ends of said legs.

4. In combination with two similar pails each having a rim bead and a chime, a holder including a handle bail having depending legs, a channel clip engaging and clamping adjacent portions of the rim beads of the two pails together and having apertures through which said legs are located, and a channel clip engaging and clamping adjacent portions of the chimes of the two pails together, perforate ears upon the last named channel clip, and hooks upon the lower ends of said legs for detachable connection to said ears.

5. In combination with two similar pails having adjacent sides abutting each other, a holder including a handle bail extending above the tops of the pails and having depending, integral legs, and spaced, separate, clamping means at the upper and lower portions of said legs for engaging and clamping adjacent upper and lower side portions of the two pails together, the lower clamping means being detachable.

6. In combination with two similar pails having adjacent sides abutting each other, a holder including a handle bail extending above the tops of the pail and having depending, integral legs, and spaced, separate, channel clip means at the upper and lower portions of said legs for engaging and clamping adjacent upper and lower side portions of the two pails together, the lower channel clip means being detachable.

7. In combination with two similar pails having adjacent sides abutting each other and each having a rim bead and a chime, a holder including a handle bail extending above the tops of the pails and having depending, integral legs, and spaced, separate, clamping means at the upper and lower portions of said legs for engaging and clamping adjacent portions of the rim beads and chimes of the two pails together, the lower clamping means being detachable.

8. In combination with two similar pails each having a rim bead and a chime, a holder including a handle bail having depending converging legs, a channel clip engaging and clamping adjacent portions of the rim beads of the two pails together and having apertures through which said legs are located, stop means on said legs above the channel clip, a second channel clip engaging and clamping adjacent portions of the chimes of the two pails together, and means for detachably connecting the last named channel clip to the lower ends of said legs.

FREDERICK G. CURTIS.